US010279924B2

(12) United States Patent
Rosado

(10) Patent No.: US 10,279,924 B2
(45) Date of Patent: May 7, 2019

(54) ENGINE EXHAUST DUCT MOUNTING ASSEMBLY

(71) Applicant: Bell Helicopter Textron Inc., Fort Worth, TX (US)

(72) Inventor: Angel David Rosado, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 65 days.

(21) Appl. No.: 15/593,956

(22) Filed: May 12, 2017

(65) Prior Publication Data

US 2018/0327108 A1  Nov. 15, 2018

(51) Int. Cl.
*B64D 27/00* (2006.01)
*B64D 41/00* (2006.01)
*B64D 33/04* (2006.01)
*B64C 1/12* (2006.01)
(Continued)

(52) U.S. Cl.
CPC ............... *B64D 41/00* (2013.01); *B64C 1/12* (2013.01); *B64D 33/04* (2013.01); *B64C 2001/0072* (2013.01); *B64D 2041/002* (2013.01); *F02C 7/20* (2013.01); *F05D 2220/50* (2013.01); *F05D 2260/30* (2013.01)

(58) Field of Classification Search
CPC .. B64D 41/00; B64D 2041/002; B64D 33/04; F05D 2220/50
See application file for complete search history.

(56) References Cited

U.S. PATENT DOCUMENTS 4,172,572 A * 10/1979 Doig .................. B64D 33/04
244/53 R
6,109,562 A *  8/2000 Crone ................ B64D 33/04
244/119
(Continued)

FOREIGN PATENT DOCUMENTS

DE  4016052 A1  11/1991
EP  1045185 A2  10/2000
(Continued)

OTHER PUBLICATIONS

European Search Report, dated Mar. 28, 2018, by the EPO, re EP Patent Application No. 17204248.3.
(Continued)

*Primary Examiner* — Richard G Davis
(74) *Attorney, Agent, or Firm* — Timmer Law Group, PLLC

(57) ABSTRACT

A mounting assembly for mounting a portion of an engine exhaust duct in an opening of an airframe panel aircraft, including a peripheral flange disposed on the portion of the exhaust duct, and at least one mounting member having an outer peripheral flange portion for connection to the airframe panel and having an inner peripheral flange portion with at least one compliant isolator member to receive the peripheral flange of the exhaust duct in a manner that suspends the exhaust duct in the opening away from the airframe panel and accommodates thermal expansion and contraction of the exhaust duct relative to the airframe panel. Embodiments include a method of mounting an engine exhaust duct in an opening of an outer airframe panel of an aircraft.

18 Claims, 6 Drawing Sheets

(51) Int. Cl.
  *B64C 1/00*  (2006.01)
  *F02C 7/20*  (2006.01)

(56) References Cited

U.S. PATENT DOCUMENTS

| | | | | |
|---|---|---|---|---|
| 2005/0258642 | A1* | 11/2005 | Brophy, III | F01N 13/1811 285/223 |
| 2010/0269328 | A1* | 10/2010 | Piesker | B64D 41/00 29/700 |
| 2011/0074150 | A1* | 3/2011 | Drost | F01N 13/1811 285/363 |
| 2016/0159489 | A1* | 6/2016 | Wilcox | B64D 33/02 244/58 |

FOREIGN PATENT DOCUMENTS

| | | | |
|---|---|---|---|
| EP | 1045185 | A3 | 7/2002 |
| EP | 2385228 | A2 | 11/2011 |
| EP | 2385228 | A3 | 6/2014 |
| EP | 3401222 | A1 | 11/2018 |

OTHER PUBLICATIONS

European Exam Report, dated Apr. 24, 2018, by the EPO, re EP Patent Application No. 17204248.3.

* cited by examiner

ENGINE EXHAUST DUCT MOUNTING ASSEMBLY

BACKGROUND

Technical Field

The present disclosure relates to an aircraft, and more particularly, to an aircraft having a mounting assembly for mounting a portion of an engine exhaust duct in an opening in an airframe panel.

Description of Related Art

Certain aircraft have main power units in or on a wing. Oftentimes the main power units, such as a gas turbine engine, are exhausted directly from the aft end of the wing. In some aircraft, an auxiliary power unit, which is typically a smaller gas turbine engine, is exhausted using a metal exhaust duct that is mounted internally cantilevered from a metal firewall in the fuselage. The exhaust duct extends from the firewall through an opening provided in an outer airframe surface panel where hot (e.g. 1200° F.) turbine exhaust gases (e.g. 1200° F. exhaust gases) are discharged to atmosphere.

In order to thermally protect the airframe panel from the hot exhaust duct, the opening in the airframe surface panel currently is over-sized to provide a clearance space between the hot exhaust duct and the airframe surface panel. However, the over-sized opening in the airframe surface panel can weaken the airframe panel and create drag that adversely affects aerodynamics of the outer airframe panel during aircraft operation.

There is a need for an improved mounting for the exhaust duct on the airframe panel of such tiltrotor and other aircraft.

SUMMARY OF THE INVENTION

In a first aspect, there is provided a mounting assembly for mounting a portion of an engine exhaust duct in an opening of an airframe panel aircraft, including a peripheral flange disposed on the portion of the exhaust duct, and at least one mounting member having an outer peripheral flange portion for connection to the airframe panel and having an inner peripheral flange portion with at least one compliant isolator member to receive the peripheral flange of the exhaust duct in a manner that suspends the exhaust duct in the opening away from the airframe panel and accommodates thermal expansion and contraction of the exhaust duct relative to the airframe panel.

In an exemplary embodiment, the at least one compliant isolator member includes a peripheral slot into which at least an outermost portion of the peripheral flange of the exhaust duct is received.

In yet another embodiment, the slot includes an inner portion for receiving the peripheral flange and an outer portion opposite from the inner portion.

In an embodiment, the slot further includes a clearance space in the outer portion.

In another embodiment, the at least one mounting member includes a first mounting plate and a second mounting plate with the at least one compliant isolator member disposed therebetween.

In an embodiment, the first mounting plate and the second mounting plate each includes a respective first outer peripheral flange portion and a second outer peripheral flange portion for connection to a contoured surface of the outer airframe panel.

In yet another embodiment, the first mounting plate and the second mounting plate each includes a respective first planar surface and a second planar surface between which the at least one compliant isolator member is disposed.

In an embodiment, the at least one compliant isolator member includes a first compliant isolator ring connected to the first mounting plate and a second compliant isolator ring connected to the second mounting plate to define a slot therebetween in which the peripheral flange portion of the exhaust duct is received.

In one embodiment, the slot includes an inner portion for receiving the peripheral flange and an outer portion opposite from the inner portion.

In an embodiment, the slot further includes a clearance space in the outer portion.

In yet another embodiment, the at least one compliant isolator member can be a metallic encapsulated insulation material.

In an exemplary embodiment, the at least one mounting member can be an aluminum alloy.

In an embodiment, there is a combination of a composite outer airframe panel and the mounting assembly including mounting the portion of the exhaust duct of a power unit in the opening of the outer airframe panel.

In one embodiment, the airframe panel includes a carbon-carbon composite.

In another embodiment, the power unit can be an auxiliary power unit.

In a second aspect, there is provided a method of mounting an engine exhaust duct in an opening of an outer airframe panel of an aircraft, including connecting a flange to the outer periphery of the exhaust duct, connecting an outer peripheral flange portion of at least one mounting member to the outer airframe panel, and suspending the flange of the exhaust duct on at least one compliant isolator member disposed on an inner peripheral flange portion of the at least one mounting member to space the exhaust duct in the opening away from the airframe panel and to accommodate thermal expansion and contraction of the exhaust duct relative to the airframe panel.

In an embodiment, the at least one compliant isolator member includes a first compliant isolator member connected to a first mounting plate and a second compliant isolator member connected to a second mounting plate to define a peripheral slot therebetween in which a portion of the flange of the exhaust duct is received.

In an exemplary embodiment, the slot includes an inner portion for receiving the peripheral flange and an outer portion opposite from the inner portion.

In another embodiment, the slot further includes a clearance space in the outer portion.

In an exemplary embodiment, the at least one compliant isolator member can be a metallic encapsulated insulation material.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the roller mechanism and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the engine exhaust duct mounting assembly 220 will be described with reference to a tiltrotor aircraft 101, it will be appreciated that the mounting assembly 220 may be used on any type of aircraft or device having an exhaust duct; for example, and not limitation, the mounting assembly 220 can be used with any helicopters, tilt wing aircrafts, unmanned aerial vehicles (UAVs), hovercrafts, other vertical lift or VTOL aircrafts, or can further be used with any vehicle or device having an exhaust duct.

Figure 1A:
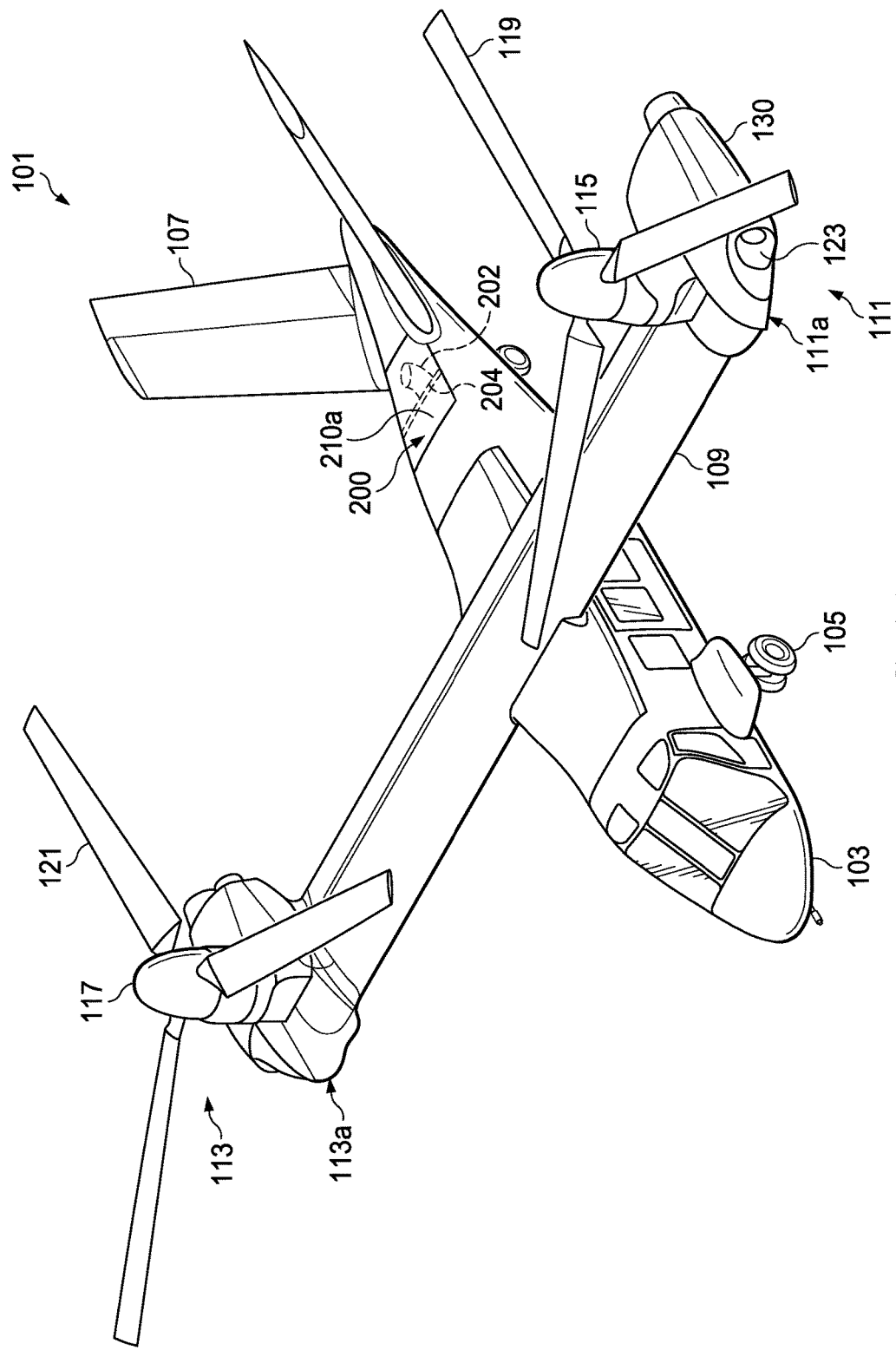
FIG. 1A is a perspective view of a tiltrotor aircraft, according to one example embodiment.

Referring to FIG. 1A in the drawings, a tiltrotor aircraft 101 is illustrated. Tiltrotor aircraft 101 can include a fuselage 103, landing gear 105, a tail member 107, and a wing member 109 having a propulsion system 111, and a propulsion system 113. Each propulsion system 111 and 113 is housed within a nacelle 111a and 113a that can include a fixed portion with an engine and a rotatable proprotor gear box proprotor (PRGB) system 115 and 117, respectively. Each rotatable proprotor gearbox system 115 and 117 has a plurality of rotor blades 119 and 121, respectively. The position of the rotatable proprotor gearbox systems 115 and 117 as well as the pitch of the rotor blades 119 and 121, can be selectively controlled in order to selectively control direction, thrust, and lift of the tiltrotor aircraft. The rotor blades 119 and 121 are each driven by an output shaft of the PRGB which is powered by engine 123 in fixed nacelle 130, all as described in aforementioned U.S. Pat. No. 9,174,731, the entire content of which is incorporated herein by reference.

Figure 1B:
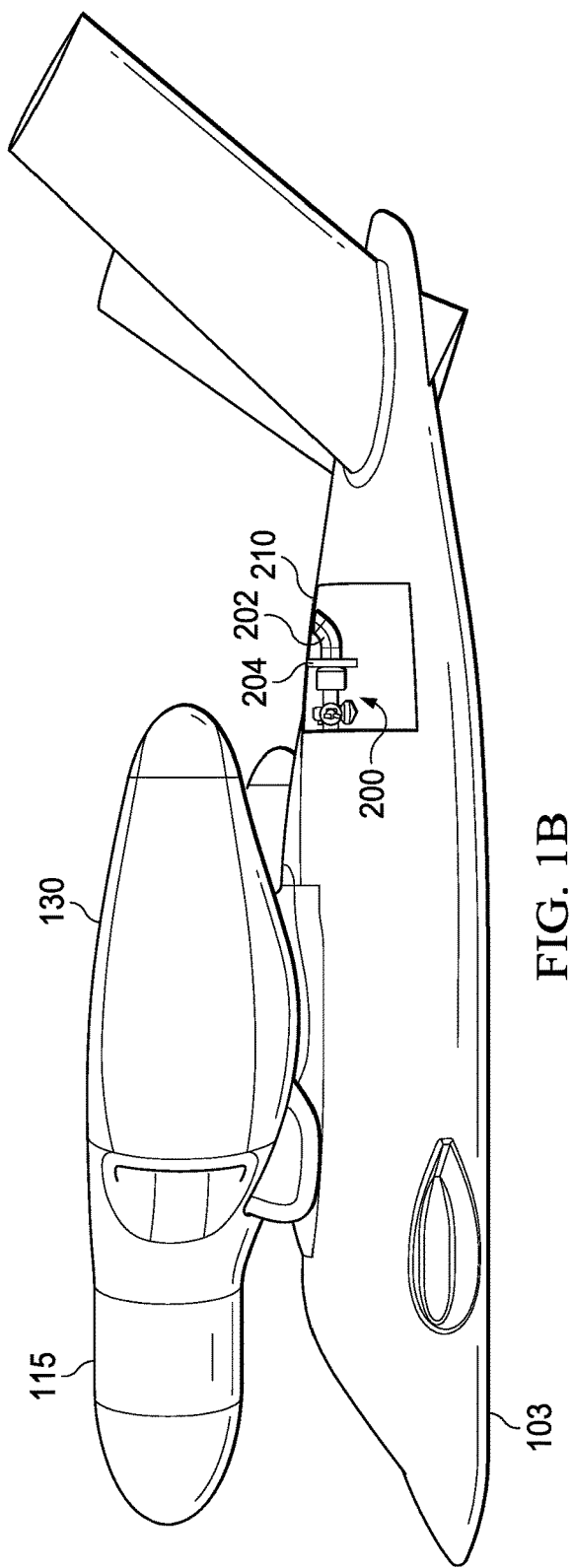
FIG. 1B is a side view of the tiltrotor aircraft in FIG. 1A with an aft portion broken away to illustrate an exhaust duct mounting assembly, according to one example embodiment.

FIG. 1A illustrates tiltrotor aircraft 101 in the vertical flight mode (helicopter mode) in which the rotatable proprotor gearbox systems 115 and 117 are positioned substantially vertical to provide a lifting thrust. Tiltrotor aircraft 101 can be operated in a forward flight mode (airplane mode), as shown in FIG. 1B, in which the rotatable proprotor gearbox systems 115 and 117 are positioned substantially horizontal to provide a forward thrust in which a lifting force is supplied by the wing member 109. It will be appreciated that tiltrotor aircraft 101 can be operated such rotatable gearbox systems 115 and 117 are selectively positioned between the airplane mode and the helicopter mode, which can be referred to as a conversion mode.

Figure 1C:
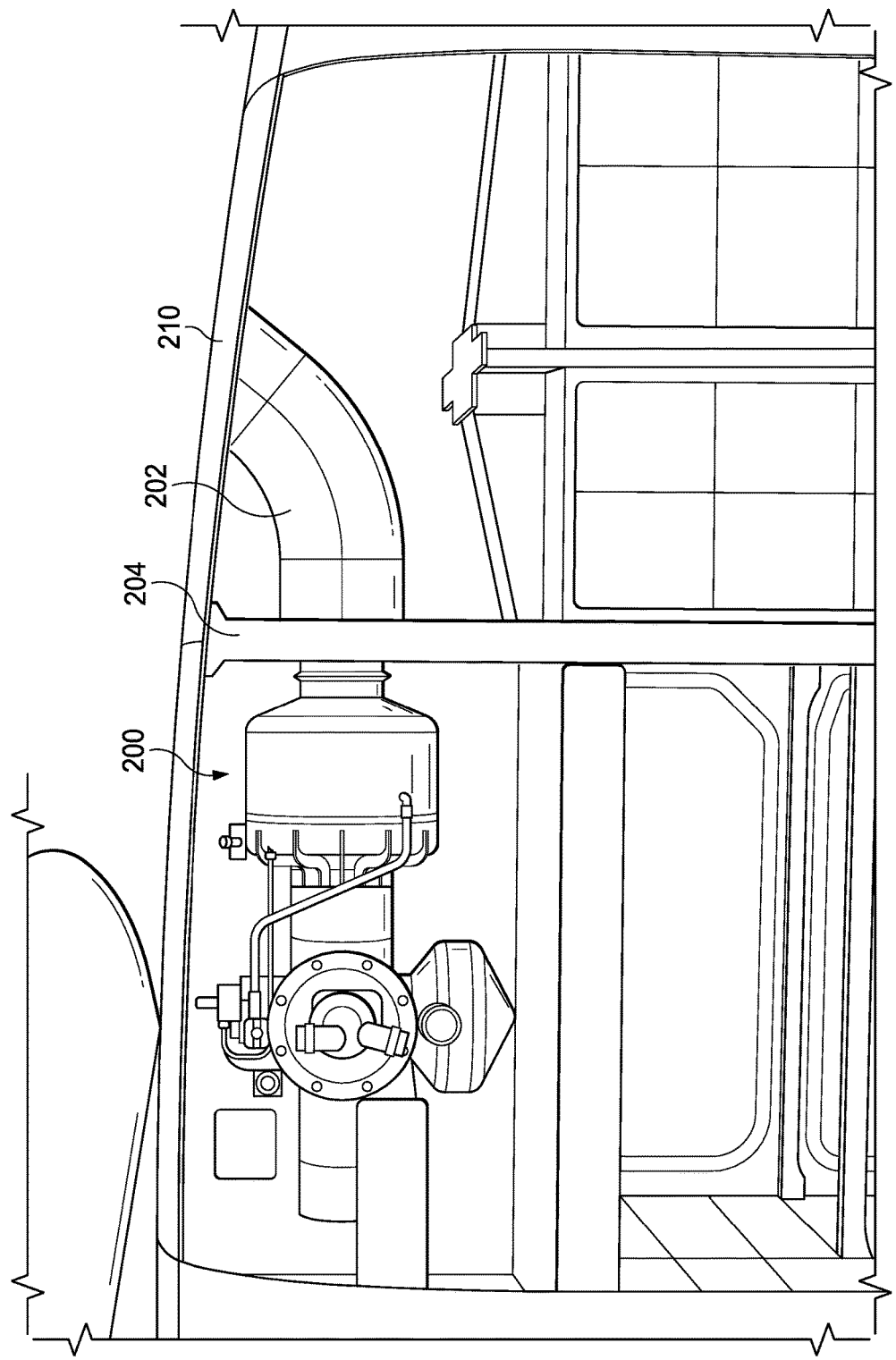
FIG. 1C is a partial, enlarged view of the aft portion broken away showing the exhaust duct mounting assembly in FIG. 1B.

Referring now to FIGS. 1A-1C and 2-3, tiltrotor aircraft 101 is provided with an auxiliary power unit 200, such as a small gas turbine engine shown schematically, that is housed in the main fuselage 103 for providing electrical power to aircraft components. The auxiliary power unit 200 is provided with a metallic exhaust duct 202 that is mounted internally cantilevered from a metallic (e.g. titanium alloy) firewall 204 in the fuselage 103. Exhaust duct 202 extends from the firewall 204 through an opening 206 provided in an outer airframe surface panel 210 where hot (e.g. 1200° F.) turbine exhaust gases (e.g. 1200° F. exhaust gases) are discharged to atmosphere, as shown in FIG. 1C.

In certain illustrative embodiments, exhaust duct 202 includes an outer peripheral flange 203 that is welded or otherwise attached to the peripheral wall of the exhaust duct 202. Exhaust duct flange 203 extends transversely relative to the long axis of the exhaust duct 202. If the exhaust duct 202 has a circular cross-section, flange 203 may extend in a substantially radial direction relative to the long axis.

In certain illustrative embodiments, the outer airframe panel 210 is an aft upper airframe panel or skin 210a, comprising a composite panel that can be damaged by heat and thermal expansion/contraction of the exhaust duct 202 relative to the outer airframe panel 210 during aircraft operation. In an embodiment, the outer airframe panel 210 is a composite panel comprised of a plurality of plies of composite fibers with resin (i.e. pre-preg). In an embodiment, the panel 210 can be at least one of the following: a carbon-carbon composite panel, a reinforced carbon-carbon composite panel, a carbon fiber sandwich panel, carbon fiber and honeycomb sandwich panel, and a carbon fiber and foam sandwich panel.

It will be appreciated that the contemplated embodiments of the mounting assembly 220 are configured for an airframe panel 210 located generally in the fuselage 103 of the aircraft 101. This disclosure contemplates that the mounting assembly 220 can be configured for use with at least one panel located on the wing member 109; nacelles 111a, 113a; tail member 107; and/or other areas suitable for mounting the end portion 202a of the exhaust duct 202 therethrough. The airframe panel 210 can be a skin, interior, or exterior surface of the aircraft 101.

Certain illustrative embodiments of the present invention provide a mounting assembly 220 to compliantly mount the end portion 202a of the exhaust duct 202 in the opening 206 in the outer airframe panel 210 in a manner to protect the airframe panel 210 from exhaust duct heat and damage caused by repeated thermal expansion/contraction of the exhaust duct 202. Use of the mounting assembly 220 is further advantageous to dampen and isolate any exhaust duct-induced vibrations during engine operation and to facilitate installation of the exhaust duct 202 by reducing tolerance build-ups with respect to the panel opening 206.

Figure 2:
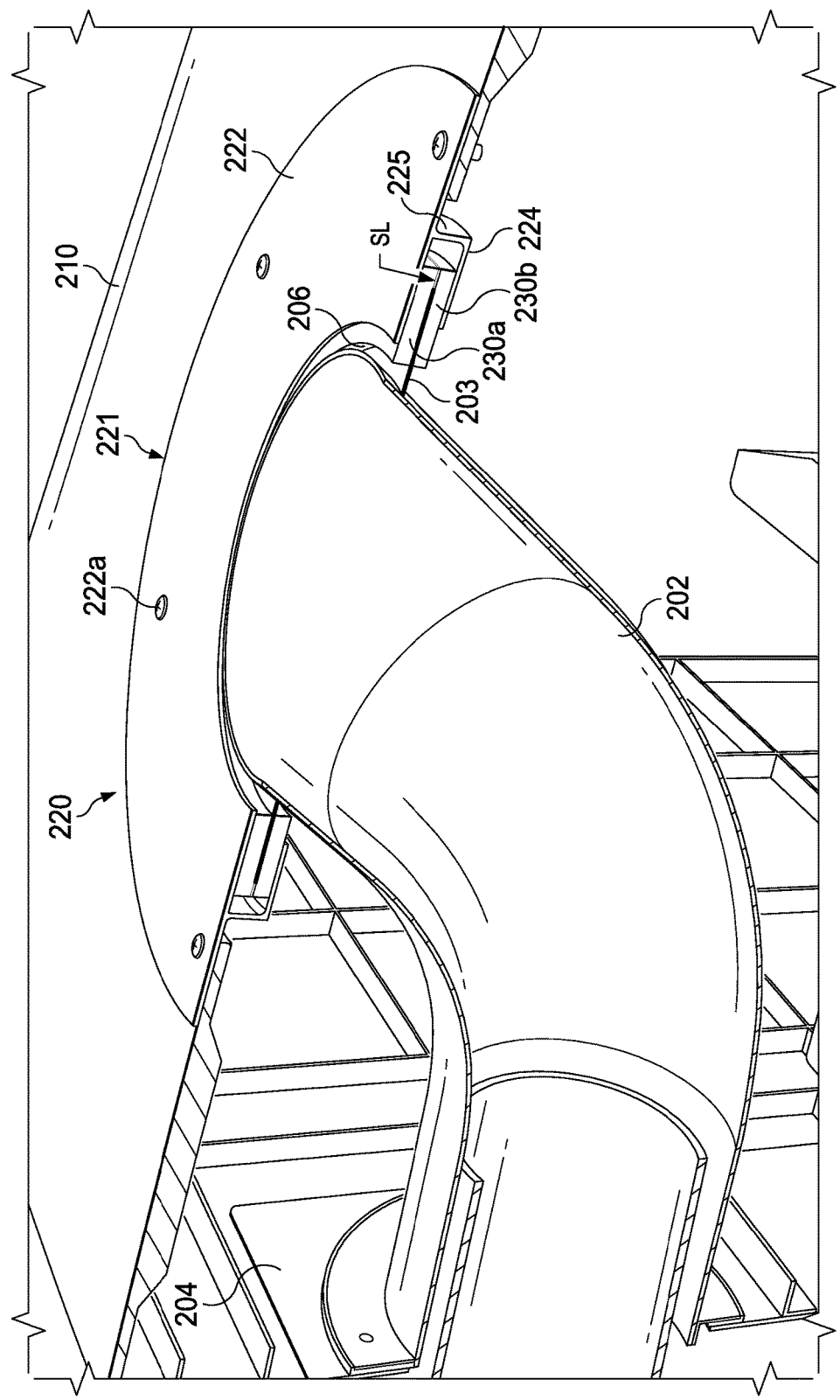
FIG. 2 is a partial perspective view of an exhaust duct mounting assembly fixedly mounted on an internal firewall in the fuselage and extending inside the fuselage to an aft upper airframe panel or skin (only partially shown) of the aircraft, according to one example embodiment.
Figure 3:
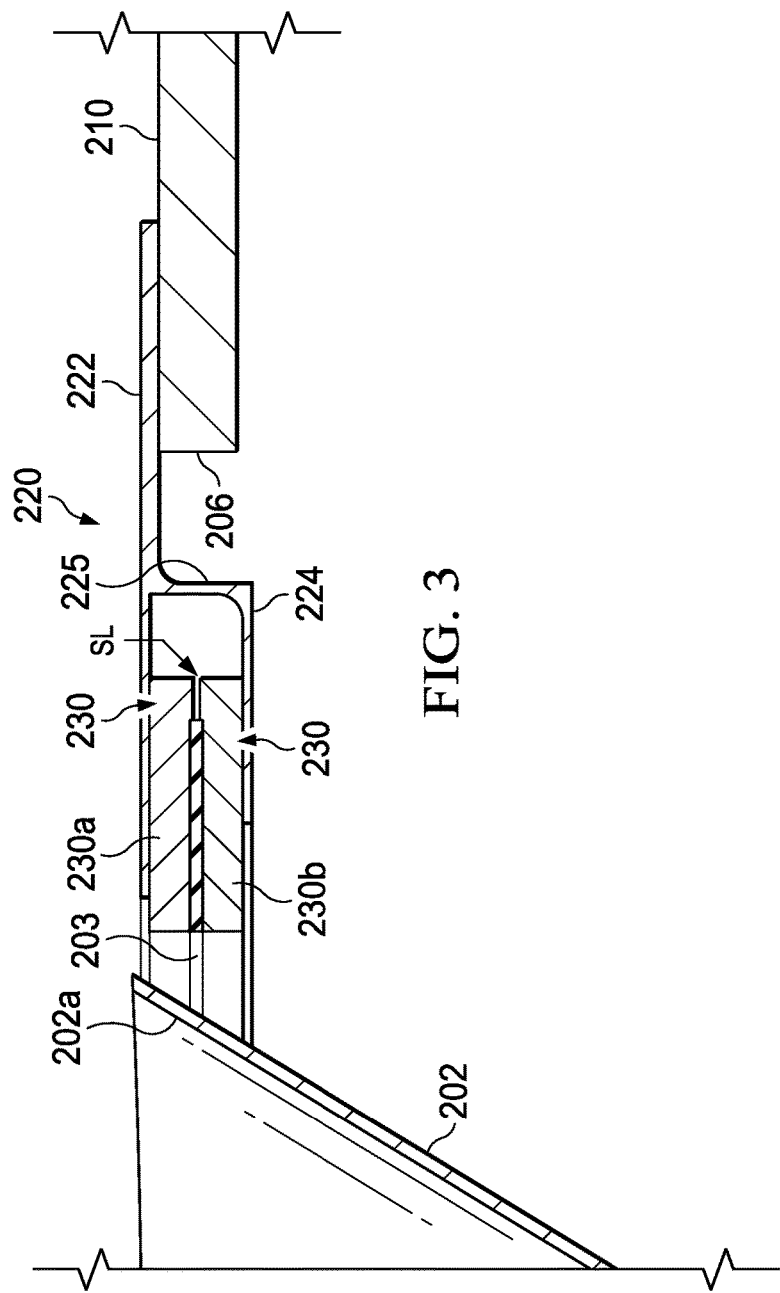
FIG. 3 is a partial side view of an exhaust duct mounting assembly, according to one example embodiment.

Referring to FIGS. 2 and 3, certain illustrative embodiments provide a mounting assembly 220 including at least one mounting member 221 shown as including a first mounting plate 222 and a second mounting plate 224. First mounting plate 222 is the upper mounting plate and second mounting plate 224 is the lower mounting plate, which can be connected by intermediate sidewall 225 as a one-piece component. The mounting plates 222, 224 can have flat (planar) or contoured surfaces to match the surface of the airframe 210. The first (upper) mounting plate 222 includes radially spaced apart holes 222a to receive fasteners for attaching the mounting assembly 220 to the exterior surface of the outer airframe panel 210.

The mounting assembly 220 can be made as a one-piece component by, for example, machining, casting, and other manufacturing processes in certain illustrative embodiments. In other embodiments, the mounting assembly 220 can be comprised of distinct and separate parts (e.g., the first mounting plate 222 and the second mounting plates are separate parts that can be fastened together using conventional fasteners and/or adhesives). In certain illustrative embodiments, mounting assembly 220 can be comprised of an aluminum alloy or other suitable material.

Referring to FIGS. 2 and 3, at least one compliant isolator member 230 is positioned between the first and second mounting plates 222, 224. In certain illustrative embodiments, the compliant isolator member 230 can comprise an upper, flat-sided compliant isolator ring 230a and a lower, flat-sided compliant isolator ring 230b, which can be adhesively or otherwise attached to the facing surface of the respective first and second mounting plates 222, 224. In certain embodiments, the upper and lower compliant isolator rings 230a, 230b can comprise to two half-rings that mate together to form a single ring structure. In other embodiments, at least one of the isolator rings 230a, 230b can be made as a one-piece ring structure.

When the mounting assembly 220 is assembled on the outer airframe panel 210, the isolator rings 230a, 230b are spaced apart and form a transversely-extending slot SL to compliantly receive and compliantly suspend the exhaust duct flange 202 in the opening 206 spaced away from the airframe panel 210 to provide a peripheral air insulating space between the exhaust duct and the mounting assembly. The mounting assembly 220 and the exhaust duct flange 203 cooperate in a manner that closes off the opening 206 in the airframe panel 210.

The outer end portion of the exhaust duct flange 203 is received in an inner portion of the slot SL. The slot SL includes a clearance space at the outer portion of the slot SL as illustrated in FIG. 3 that allows the exhaust duct flange 203 to move transversely (e.g. radially) in the slot SL to accommodate transverse (e.g. radial) thermal expansion/contraction of the exhaust duct 202.

In certain illustrative embodiments, the isolator rings 230a, 230b are made of metallic encapsulated, semi rigid insulating core material such that the isolator rings are capable of reversible deflection in the axial direction perpendicular to the slot SL in order to accommodate axial thermal expansion/contraction of the exhaust duct 202 and isolate the thermal expansion/contraction within the mounting assembly 220.

In certain embodiments, the isolator rings 230a, 230b can be made of a thermal insulating material to contain and isolate heat from the exhaust duct flange 203 within the mounting assembly 220.

Although FIGS. 2-3 illustrate the compliant isolator member 230 as comprising first and second isolator rings, the isolator member 230 can comprise a one-piece component, such as C-shaped component, with slot SL machined, molded, or otherwise provided to receive the exhaust duct flange 203. Such a one-piece isolator member 230 can be attached on a one-piece mounting member in certain illustrative embodiments.

Figure 4:
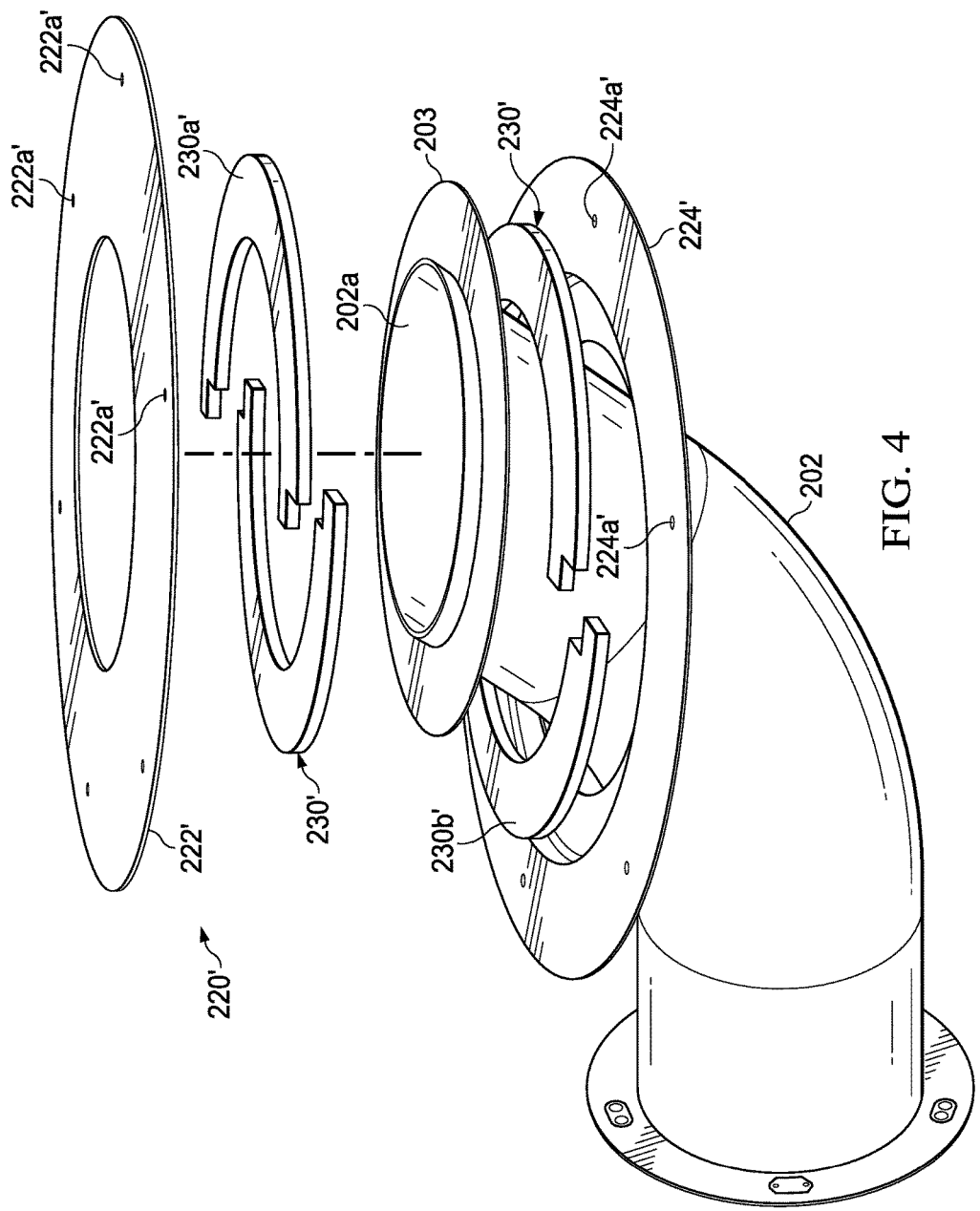
FIG. 4 is an exploded view of the exhaust duct mounting assembly according to one example embodiment.

FIG. 4 illustrates an embodiment of an exhaust duct mounting assembly 220'. Certain components of the mounting assembly 220' are as described above. Those components bear similar reference characters to the components of the mounting assembly 220, but are primed. The mounting assembly 220' includes first and second mounting plates 222', 224' that are made as separate plates from one another, rather than as a one-piece component as in FIGS. 2-3.

The first and second mounting plates 222', 224' each includes respective holes 222a', 224a' to receive fasteners for attaching the mounting assembly 220' to the respective outer and inner surface of the outer airframe panel 210. Moreover, in FIG. 4, the upper and lower compliant rings 230a', 230b' are shown for purposes of illustration and not limitation as each including two half-rings that mate together to form a single isolator ring structure.

The illustrative embodiment shown in FIG. 4 otherwise functions in a similar manner as described for the FIGS. 2-3. For example, when the mounting assembly 220' is assembled on the outer airframe panel 210, the isolator rings 230' are spaced apart to define a transversely-extending slot that compliantly receives and suspends the exhaust duct flange 203 in the opening 206 spaced away from the airframe panel 210 in the manner described above and shown in FIGS. 2-3 to provide a peripheral air insulating space between the exhaust duct and the mounting assembly. The mounting assembly 220' and the exhaust duct flange 203 cooperate in a manner that closes off the opening 206 in the airframe panel 210 as described above for FIGS. 2-3. The outer end portion of the exhaust duct flange 203 is received in a slot (SL in FIGS. 2-3) provided between isolator members 230a', 230b' with a clearance space at the outer portion of the slot SL (as illustrated in FIG. 3) that allows the exhaust duct flange 203 to move transversely (e.g. radially) in the slot to accommodate transverse (e.g. radial) thermal expansion/contraction of the exhaust duct 202.

An embodiment provides a method of mounting the engine exhaust duct 202 in an opening 206 of an outer airframe panel 210 of an aircraft 101 including connecting a flange 203 that is welded to the outer periphery of the exhaust duct 202, connecting an outer peripheral portion of the at least one mounting member 221 to the outer airframe panel 210, and suspending the flange 203 of the exhaust duct 202 on at least one compliant isolator member 230 disposed on an inner peripheral portion of the at least one mounting member 221 to space the exhaust duct in the opening 206 away from the airframe panel and to accommodate thermal expansion and contraction of the exhaust duct 202 relative to the airframe panel 210.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A mounting assembly for mounting a portion of an engine exhaust duct in an opening of an airframe panel aircraft, comprising:
    an exhaust duct flange disposed on the portion of the exhaust duct, and
    at least one mounting member comprising a first mounting plate and a second mounting plate connected to the first mounting plate with at least one compliant isolator member disposed therebetween; the first mounting plate having an outer peripheral flange portion for connection to the airframe panel and the first mounting plate and the second mounting plate with the at least one compliant isolator member having an inner peripheral flange portion configured to receive the exhaust duct flange in a manner that suspends the exhaust duct in the opening away from the airframe panel and accommodates thermal expansion and contraction of the exhaust duct relative to the airframe panel.

2. The assembly of claim 1, wherein the at least one compliant isolator member includes a peripheral slot into which at least an outermost portion of the exhaust duct flange is received.

3. The assembly of claim 2, wherein the slot comprises an inner portion for receiving the exhaust duct flange and an outer portion opposite from the inner portion.

4. The assembly of claim 3, wherein the slot further comprises a clearance space in the outer portion.

5. The assembly of claim 1, wherein the first mounting plate and the second mounting plate each includes a respective first planar surface and a second planar surface between which the at least one compliant isolator member is disposed.

6. The assembly of claim 1, wherein the at least one compliant isolator member comprises a first compliant isolator ring connected to the first mounting plate and a second compliant isolator ring connected to the second mounting plate to define a slot therebetween in which the exhaust duct flange is received.

7. The assembly of claim 6, wherein the slot comprises an inner portion for receiving the exhaust duct flange and an outer portion opposite from the inner portion.

8. The assembly of claim 7, wherein the slot further comprises a clearance space in the outer portion.

9. The assembly of claim 1, wherein the at least one compliant isolator member comprises a metallic encapsulated insulation material.

10. The assembly of claim 1, wherein the at least one mounting member comprises an aluminum alloy.

11. A combination of a composite outer airframe panel and the mounting assembly of claim 1 including mounting the portion of the exhaust duct of a power unit in the opening of the outer airframe panel.

12. The combination of claim 11, wherein the airframe panel comprises a carbon-carbon composite.

13. The combination of claim 11, wherein the power unit comprises an auxiliary power unit.

14. A method of mounting an engine exhaust duct in an opening of an outer airframe panel of an aircraft, comprising:
    connecting a flange to the outer periphery of the exhaust duct;
    connecting an outer peripheral flange portion of at least one mounting member to the outer airframe panel; and
    suspending the flange of the exhaust duct on at least one compliant isolator member disposed on an inner peripheral flange portion of the at least one mounting member to space the exhaust duct in the opening away from the airframe panel and to accommodate thermal expansion and contraction of the exhaust duct relative to the airframe panel.

15. The method of claim 14, wherein the at least one compliant isolator member comprises a first compliant isolator member connected to a first mounting plate and a second compliant isolator member connected to a second mounting plate to define a peripheral slot therebetween in which a portion of the flange of the exhaust duct is received.

16. The method of claim 15, wherein the slot comprises an inner portion for receiving the peripheral flange and an outer portion opposite from the inner portion.

17. The method of claim 16, wherein the slot further comprises a clearance space in the outer portion.

18. The method of claim 14, wherein the at least one compliant isolator member comprises a metallic encapsulated insulation material.

* * * * *